United States Patent [19]

Fujiwa et al.

[11] Patent Number: 5,191,027

[45] Date of Patent: Mar. 2, 1993

[54] COMPOSITION COMPRISING AN EPOXY COMPOUND

[75] Inventors: Takaaki Fujiwa, Hiroshima; Ikuo Takahashi, Himeji; Hiroyuki Oshima, Hiroshima, all of Japan

[73] Assignee: Daicel Chemical Industries, Ltd., Osaka, Japan

[21] Appl. No.: 522,025

[22] Filed: May 11, 1990

[30] Foreign Application Priority Data

May 12, 1989 [JP] Japan .................................. 1-119672

[51] Int. Cl.$^5$ .............................................. C08F 8/08
[52] U.S. Cl. .................................. 525/332.1; 525/386; 525/387; 526/281; 526/282; 526/283
[58] Field of Search ........................................ 525/332.1

[56] References Cited

U.S. PATENT DOCUMENTS 3,294,658 12/1966 Atchison et al. .
3,842,010 10/1974 Pappas et al. ..................... 525/332.1
4,565,859 1/1986 Murai et al. .
4,841,017 6/1989 Murai et al. .

FOREIGN PATENT DOCUMENTS 237255A 9/1987 European Pat. Off. .
0904549 8/1962 United Kingdom .

*Primary Examiner*—Bernard Lipman
*Attorney, Agent, or Firm*—Sughrue, Mion, Zinn, Macpeak & Seas

[57] ABSTRACT

A novel composition is disclosed comprising an alicyclic epoxy compound formed by an epoxidation reaction of a polymerized cyclo olefin compound having double bonds with an epoxidating agent.

A cured epoxy resin according to the present invention has excellent heat resistance, outdoor durability, and water resistance, attributable to the absence of ether units derived from the ring-opening of epoxy groups and hydroxyl groups derived from an initiating agent.

4 Claims, No Drawings

COMPOSITION COMPRISING AN EPOXY COMPOUND

FIELD OF THE INVENTION

The present invention relates to a novel composition comprising an alicyclic epoxy compound, which can be obtained by an epoxidation reaction of a polymerized composition having double bonds comprising a cyclo olefin compound with an epoxidating agent.

A cured epoxy resin comprising the present composition has excellent heat resistance, outdoor durability, and water resistance.

BACKGROUND OF THE INVENTION

Hitherto, various types of epoxy resins have been widely made and used on a commercial basis.

Epoxy resins which have been widely used in industries include so-called epi-bis type epoxy resins produced by reacting bisphenol A with epichrolhydrine.

These resins have advantages, e.g., various products can be obtained, from a state of liquid to solid, and they can be cured at room temperatures with polyamines because the reactivity of the epoxy resins is high.

However, the cured products thereof are defective in that the outdoor durability is poor, the electric properties such as anti-tracking property, etc., are poor, and the heat distortion temperature is low, although they do have desirable characteristics of good water resistance and strength.

Recently, particularly epoxy resins prepared by reacting phenolic resin or novolak resin with epichrolhydrine have been used as resins for encapsulating VLSI (very large scale integrated circuit), etc., but chlorine contained in the resins, typically in an amount of several hundred parts per million, causes the problem of a deterioration of the electric properties of such electronic devices.

Epoxy resins having excellent electric properties and heat resistance, and which do not contain chlorine are known, such as certain alicyclic epoxy resins which are produced by an epoxidation reaction of a compound having a 5- or 6-membered cycloalkenyl structure.

The epoxy group in these resins is a so-called inner epoxy group, and curing is usually carried out with acid anhydride by heating.

However, since their reactivity is low, they cannot be cured with polyamines at room temperatures, and therefore, the use of the alicyclic epoxy resins has so far been technically restricted.

As alicyclic epoxy resins, those having a structure represented by formula (VII) or (VII) are presently used on a commercial basis.

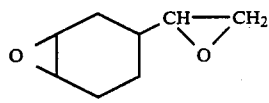　(VII)

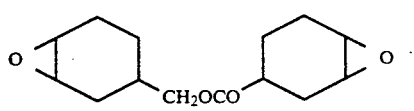　(VIII)

(VII) is used as a heat resistible epoxy diluent, because of its very low viscosity.

However, it has the disadvantage of possessing high toxicity and causes the problem of poisoning upon contact with the skin of the human body.

(VIII) contains only a small amount of impurities and has a low color hue, and the cured products produced therewith have a high heat distortion temperature.

However, much epoxy resins suffer from the problem that they possess poor water resistance due to the presence of ester bonds.

In addition, because (VII) and (VIII) are epoxy resins having a low viscosity, it is impossible to apply molding systems for solid epoxy resins, such as transfer molding, etc., thereto.

From the above viewpoint, novel alicyclic epoxy resins which have oxycyclohexane units derived from 4-vinylcyclohexene-1-oxide were disclosed in Japanese Publication (Kokai) No. 166675/1985, corresponding to U.S. Pat. No. 4,565,859.

In addition, novel alicyclic epoxy resins which have oxynorbornane units derived from 4-vinylbicyclo[2.2.1]heptene-1-oxide in place of oxycyclohexane units were disclosed in Japanese Application (Priority) No. 215526/1987, etc., corresponding to U.S. Pat. No. 4,841,017.

Further, novel alicyclic epoxy resins, which have closslinked structures between the oxycyclohexane units, were disclosed in Japanese Application (Priority) No. 50361/1987, etc.

Nevertheless, the above epoxy resins do not have a completely sufficient water resistance and resistance to hydrolysis, because of the ether units and hydroxyl groups.

It is noted that the ether units are formed by the ring opening of the epoxy groups possessed by 4-vinylcyclohexene-1-oxide or 4-vinylbicyclo[2.2.1]heptene-1-oxide, and that the hydroxyl groups are derived from an initiating agent for a ring-opening reaction.

In addition, not only the overcoming of the above described problems, but also the number of methods or objects involving the use of epoxy resins have grown, and so have the desired characteristics of such epoxy resins; for example, demands for epoxy resins having excellent water resistance and excellent ductility have increased.

SUMMARY OF THE INVENTION

An object of the present invention is to provide a novel composition comprising an alicyclic epoxy compound having excellent resistance to hydrolysis and water.

From the above viewpoint, and as a result of intensive studies by the present inventors, it has been found that a composition obtained by an epoxidation reaction of a polymerized unsaturated compound having alicyclic structures in a molecule with an epoxidation agent can provide an epoxy resin having an excellent water resistance and resistance to hydrolysis.

The composition of the present invention comprises at least one epoxy compound represented by formula (I), (II), or (III) described hereinafter, respectively,

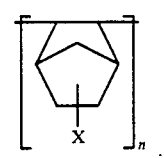　(I)

-continued $$\left[ \begin{array}{c} \diagup \diagdown \\ Y \end{array} \right]_n \quad (II)$$

$$\left[ \begin{array}{c} \diagup \diagdown \\ \diagdown Z \diagup \end{array} \right]_n \quad (III)$$

wherein
n is an integer of 2 to 1,000, X represents a mixture of $$-\mathrm{CH}\underset{O}{\overset{}{\diagup}}\mathrm{CH}_2, \; -\mathrm{CH}=\mathrm{CH}_2, \; \text{and} \; -\underset{OR}{\overset{}{\mathrm{CH}}}-\underset{OR}{\overset{}{\mathrm{CH}_2}}$$

groups, in which R is either H, an alkyl group, an alkyl carbonyl group, or an aryl carbonyl group, provided that at least one $$-\mathrm{CH}\underset{O}{\overset{}{\diagup}}\mathrm{CH}_2$$

group is contained therein,
Y represents a mixture of $$\underset{H}{\overset{O}{\diagdown}}\mathrm{C}\underset{}{\overset{}{\diagdown}}\mathrm{C}-\mathrm{CH}_3, \; -\mathrm{C}=\mathrm{C}-\mathrm{CH}_3, \; \text{and} \; -\underset{HO}{\overset{H}{\mathrm{C}}}-\underset{OR}{\overset{H}{\mathrm{C}}}-\mathrm{CH}_3$$

groups contained therein, groups, in which R is either H, an alkyl group, an alkyl carbonyl group, aryl carbonyl group, provided that at least one $$\underset{}{\overset{O}{\diagdown}}\mathrm{C}\underset{}{\overset{}{\diagdown}}\mathrm{C}-\mathrm{CH}_3$$

group is contained therein, and
Z represents a mixture of $$-\underset{H}{\overset{O}{\mathrm{C}}}\underset{H}{\overset{}{\diagdown}}\mathrm{C}-, \; -\mathrm{C}=\mathrm{C}-, \; \text{and} \; -\underset{HO}{\overset{H}{\mathrm{C}}}-\underset{OR}{\overset{H}{\mathrm{C}}}-$$

groups, in which R is either H, an alkyl group, a alkyl carbonyl group, or a aryl carbonyl group provided that at least one $$-\underset{H}{\overset{O}{\mathrm{C}}}\underset{H}{\overset{}{\diagdown}}\mathrm{C}-$$

group is contained therein.

DETAILED DESCRIPTION OF THE INVENTION

The present invention is described hereinafter in more detail.

A composition comprising alicyclic epoxy compound represented by formula (I)

$$\left[ \begin{array}{c} \diagup \diagdown \\ X \end{array} \right]_n \quad (I)$$

as a first embodiment of the present invention, for example, can be produced by an epoxidation reaction of side vinyl groups in polymerized 5 vinyl-2-norbornene represented by formula (IV)

$$\left[ \begin{array}{c} \diagup \diagdown \\ \mathrm{CH}=\mathrm{CH}_2 \end{array} \right]_n \quad (IV)$$

with an oxidation agent such as a peracid.

A composition comprising an alicyclic epoxy compound represented by formula (II)

$$\left[ \begin{array}{c} \diagup \diagdown \\ Y \end{array} \right]_n \quad (II)$$

as a second embodiment of the present invention, for example, can be produced by an epoxidation reaction of an inner double bond of polymerized 5-ethylidene-2-norbornene represented by formula (V)

$$\left[ \begin{array}{c} \diagup \diagdown \\ \underset{H}{\overset{\parallel}{\mathrm{C}}}-\mathrm{CH}_3 \end{array} \right]_n \quad (V)$$

with an oxidation agent such as a peracid.

A composition comprising an alicyclic epoxy compound represented by formula (III)

$$\left[ \begin{array}{c} \diagup \diagdown \\ \diagdown Z \diagup \end{array} \right]_n \quad (III)$$

as a third embodiment of the present invention, for example, can be produced by an epoxidation reaction of double bonds (inner olefin) in 5-membered alicyclic structures of poly (dicyclopentadiene) represented by formula (VI), which is obtained by a polymerization of double bonds of norbornene structures of dicyclopentadiene,

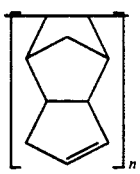
(VI)

with an oxidation agent such as a peracid.

Poly(5-vinyl-2-norbornene) (IV), poly(5-ethylidenenorbornene) (V), poly(dicyclopentadiene) (VI) can be produced by a polymerization reaction of each of the above-described monomers in the presence of a catalyst composed of a mixture of a transition metal compound with an aluminoxane compound (described below) in a solvent such a hydrocarbon.

The specific hydrocarbon solvent includes an aliphatic hydrocarbon such as butane, isobutane, pentane, hexane, heptane, and/or octane, an aromatic hydrocarbon such as benzene, toluene and xylene, and/or a petroleum distillate such as gasoline, kerosene oil, and/or light oil.

An aromatic hydrocarbon is most preferably used.

A conventional polymerization method such as a suspension polymerization or a solution polymerization, can be used without restriction in the present invention.

Preferably polymerization temperatures are from about $-50°$ to $230°$ C., more preferably from $-30°$ to $200°$ C., and most preferably from $0°$ to $150°$ C.

The amount of the transition metal compound is from $10^{-7}$ to $10^{-1}$ gram.atom /l, based on the concentration of the metal atom, and preferably from $10^{-5}$ to $10^{-2}$ gram.atom /l in the case of a liquid phase polymerization process of the present invention.

The catalyst to be used is composed of a mixture of a transition metal compound with the aluminoxane.

The preferable transition metal compound includes a transition metal selected from IV B, VB, or VI B group of the periodic table.

The specific transition metal compound may, for example, include a compound of titanium, zirconium, hafnium, vanadium, or chromium, and is preferably titanium or zirconium, as these have a higher activity.

The preferable form of the transition metal compound includes a compound having a halogen atom(s) and a hydrocarbon group(s) or a compound having a hydrocarbon group(s) or an alkoxy group(s). The specific halogen atom includes fluorine, chlorine, bromine or iodine.

The specific hydrocarbon group includes an alkyl group such as methyl group, ethyl group, propyl group, isopropyl group, n-butyl group, secbutyl group, tert-butyl group or isobutyl group; an alkenyl group such as isopropenyl group or 1-butenyl group; a cycloalkadienyl group such as cyclo pentadienyl group, methyl cyclopentadienyl group, tetramethyl cyclopentadienyl group, indenyl group or tetrahydroindenyl group; and an aralkyl group such as benzyl group or neophyl group.

The specific alkoxy group(s) includes an alkyl alkoxy group such as methoxy group, ethoxy group, n-propoxy group, isopropoxy group, n-butoxy group, isobutoxy group, sec-butoxy group, tert-butoxy group, and an alkoxy group having a cyclic structure, such as a cyclohexanoxy group and a menthoxy group.

Specific transition metal compounds include: titanium compounds such as titanium tetrachloride, titanium trichloride, bis(pentadienyl)dimethyl titanium, dimethyl titanium, bis(cyclopentadienyl)dimethyl titanium,bis(cyclopentadienyl)diisopropyl titanium,bis(methylcyclopentadienyl)dimethyl titanium, bis(methylcyclopentadienyl)methyl titanium monochloride, bis(cyclopentadienyl)ethyl titanium monochloride, bis(cyclopentadienyl)isopropyl titanium monochloride, bis(cyclopentadienyl)methyl titanium monobromide, bis(cyclopentadienyl)methyl titanium monoiodide, bis(cyclopentadienyl)methyl titanium monofluoride, bis(indenyl)methyl titanium monochloride, bis(indenyl)methyl titanium monobromide, bis(cyclopentadienyl)titanium dichloride, bis(cyclopentadienyl)titanium dibromide, bis(cyclopentadienyl) titanium diiodide, bis(cyclopentadienyl) titanium difluoride, bis(indenyl) titanium dichloride, bis(indenyl)titanium dibromide, ethylenebis(indenyl)titanium, tetramethoxy titanium dichloride, tetramethoxy titanium dichloride, tetraethoxy titanium, tetra-n-propoxy titanium, tetra-n-butoxy titanium, tetraisopropoxy titanium, tetra-sec-butoxy titanium, tetra-tert-butoxy titanium, and tetramethoxy titanium; zirconium compounds such as zirconium tetrachloride, bis(cyclopentadienyl)dimethyl zirconium, bis(cyclopentadienyl)diethyl zirconium, bis(cyclopentadienyl)diisopropyl zirconium, bis(methylcyclopentadienyl)dimethyl zirconium, bis(cyclopentadienyl)methyl zirconium monochloride, bis(cyclopentadienyl)ethyl zirconium monochloride, bis(cyclopentadienyl)isopropyl zirconium monochloride, bis(cyclopentadienyl)methyl zirconium monobromide, bis(cyclopentadienyl)methyl zirconium monoiodide, bis(cyclopentadienyl) zirconium dichloride, bis(cyclopentadienyl) zirconium difluoride, bis(cyclopentadienyl) zirconium dibromide, bis(cyclopentadienyl) zirconium monochloridehydride, bis(indenyl) zirconium dichloride, bis(indenyl) zirconium dibromide, ethylenebis(indenyl) zirconium dichloride, ethylenebis(indenyl) zirconium dibromide, tetramethoxy zirconium, tetraethoxy zirconium, tetra-n-propoxy zirconium, tetraisopropoxy zirconium, tetra-n-butoxy zirconium, tetraisobutoxy zirconium, tetra-sec-butoxy zirconium, tetra-tert-buthoxy zirconium, and tetramenthoxy zirconium; hafnium compounds such as hafnium tetrachloride, bis(cyclopentadienyl) dimethyl hafnium, bis(cyclopentadienyl)methyl hafnium monochloride, bis(cyclopentadienyl)ethyl hafnium monochloride, bis(cyclopentadienyl) hafnium dichloride, bis(cyclopentadienyl)hafnium dibromide, bis(cyclopentadienyl)hafnium monochloridehydride, bis(indenyl)hafnium dichloride, ethylenebis(indenyl)hafnium dichloride, tetraethoxy hafnium, tetra-n-propoxy hafnium, tetraisopropoxy hafnium, tetra-n-butoxy hafnium, tetra-tert-butoxy hafnium, and tetramethoxy hafnium; vanadium compounds such as bis(cyclopentadienyl) vanadium, bis(cyclopentadienyl)vanadium monochloride, etc.

Aluminoxane, which is another catalytic component used to prepare the raw materials of the present invention, is represented by the formulae:

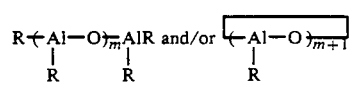

wherein R is a hydrocarbon group and m is an integer of 1 or more.

R is a hydrocarbon group unsubstituted or having one or more substituent groups such as a methyl group, ethyl group, propyl group, isopropyl group, and/or butyl group, more preferably a methyl group, in the aluminoxane, and m is an integer of 1 or more, preferably more than 5, and more preferably 10 to 100.

The aluminoxane can be produced by either the following method (1) or (2).

(1) a compound having absorbed water or a compound having water of crystallization, such as a hydrate of copper sulphate or a hydrate of aluminum sulphate, is suspended in an organic solvent, followed by reacting while adding trialkyl aluminum.

(2) a reaction of trialkyl aluminum suspended in an organic solvent with water added directly thereto.

The above method (1) is more preferable than the above method (2).

In addition, aluminoxane can also include a small amount of organic metallic compound.

For reference, it is noted that a detailed process for the production of polymers (IV), (V) and (VI), which are starting materials of the present novel epoxy composition (I), (II), and (III) respectively is provided in the specification of Japanese Application (Priority) No. 332330/1988 (filed in Jan. 4, 1989).

The present novel compositions (I), (II), and (III) can be produced by an epoxidation reaction of unsaturated double bonds in (IV), (V) and (VI).

In the epoxy compositions (I), (II), and (III), the unsaturated double bonds are at least partially epoxidized, on a commercial basis, and n is 2 to 1000, preferably 10 to 1000.

Accordingly, n in formula (IV), (V) and (VI) must be 2 to 1000.

The size of n, which corresponds to the degree of polymerization, can be adjusted by controlling the amount of catalyst and the temperature.

When it is desired to produce a higher molecular weight compound, smaller amounts of catalyst and higher temperatures are usually applied during the polymerization reaction.

On the other hand, when it is desired to produce a lower molecular weight compound, increased amounts of catalyst and lower temperatures are usually applied during the polymerization reaction.

n in the formula (I), (II) and (III) is not more than 1000, because much long chain compositions are insoluble in organic solvents.

On the other hand, it is preferred that n is not less than 10, because cured resins of such epoxy compositions are relatively brittle and have a low strength.

Upon an epoxidation reaction in which compositions (IV), (V) or (VI) are epoxidized with an epoxidating agent to produce the present compositions (I), (II) or (III), peracetic acids or hydroperoxides can be used as the epoxidating agent. As the peracids, performic acid, peracetic acid, perbenzoic acid and trifluoroperacetic acid can be used.

Of these peracids, peracetic acid is the preferred epoxidating agent, because it is available on an industrial basis at a moderate price and has a high stability.

As the hydroperoxides, hydrogen peroxide, tertiary butyl hydroperoxide, cumen peroxide, and metha-chloroperbenzoic acid can be used.

When carrying out the epoxidation, a catalyst can be used as appropriate to the circumstances.

In the case of peracids, for example, alkalis such as sodium carbonate, and acids such as sulfuric acid, can be used as a catalyst.

In the case of using hydroperoxide, it is possible to obtain a catalytic effect, for example, by using a mixture of tungstic acid and sodium hydroxide together with hydrogen peroxide, or hexacarbonylmolybdenum together with tertiary butyl hydroperoxides. The epoxidation reaction is carried out in the absence or presence of a solvent, while controlling the reaction temperature according to the apparatus used and the properties of the raw materials.

The temperature region of the epoxidation reaction can be selected according to the reactivity of the epoxidating agent. In the case of peracetic acid, which is the preferable epoxidating agent, the preferable temperature is from 0° to 70° C.

If the temperature is under 0° C., the reaction velocity is slow, but if the temperature is over 70° C., decomposition of the peracetic acid can occur.

In the case of a tertiary butyl hydroperoxide molybdenum dioxide diacetyl acetate, which is an example of a hydroperoxide, the preferable temperature range is from 20° to 150° C., based on the same considerations.

The use of solvents for dilution is effective for lowering the viscosity of raw materials and stabilizing the epoxidation agent.

In the case that peracetic acid is used as the epoxidating agent, a preferable solvent is an aromatic compound ether or ester.

The molar ratio of the epoxidating agent to be used to the unsaturated bonds, i.e., the vinyl groups, is selected according to the proportion of unsaturated bonds which it is desired retain.

When preparing epoxy compositions having many epoxy groups, an equal or higher molar ratio of the epoxidating agents to the unsaturated bonds is preferably used, but using amounts of the epoxidating agents at a molar ratio of more than 10 with respect to the unsaturated bonds is not preferable, because of the cost and of the side reactions described below.

In the case of peracetic acid, preferably the molar ratio is 1/1 to 5/1.

Esterified groups are produced by the sidereaction between epoxy groups and acetic acid byproduct, depending upon the epoxidating conditions, with a generation of the epoxy groups from olefin groups.

That is, the present compositions (I), (II) or (III) comprising epoxy compounds may contain units corresponding respectively to a formula (IV), (V) or (VI), in part.

In addition, the present compositions (I), (II) or (III) may also contain units having a substituent group formed by an esterification of epoxy groups generated during the epoxidating reaction with acids generated from the peracids.

For example, where the present composition (I) is produced by an epoxidation reaction of the composition (IV) with peracetic acid, X in formula (I) is composed of a mixture of

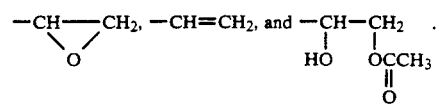

In the present composition (I), at least one

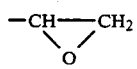

group is contained, and more preferably, the number of

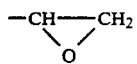

groups is relatively large and the number of

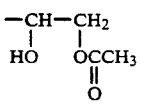

groups is relatively small.

On the other hand, where the present composition (II) is produced by an epoxidation reaction of the composition (VII) with peracetic acid, Y in formula (II) is composed of a mixture of

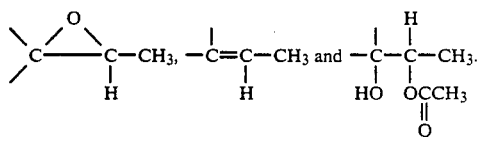

In the present composition (II), preferably the number of

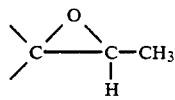

group is relatively large and the number of

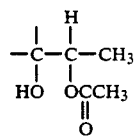

groups is relatively small.

Also, where the present composition (III) is produced by an epoxidation reaction of the composition (VI) with peracetic acid, Z in formula (III) is composed of a mixture of

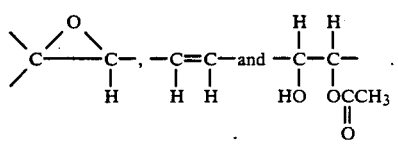

In the present composition (III), preferably the number of

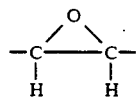

groups is relative large and and the number of

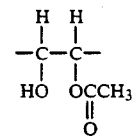

groups is relatively small.

The relative amounts of the three different substituent groups including at least one epoxy group described hereinabove depend on the ratio of the epoxidating agents to the double bonds, the kinds of epoxidating agents, and the reaction conditions.

The desired compound can be separated from the crude reaction solution by a conventional chemical process such as concentration.

The present invention is now illustrated by examples, as follows.

EXAMPLE 1 Preparation of aluminoxane:

Preparation of aluminoxane was carried out while streaming nitrogen gas through the reaction flask.

First, 18.4 g of $CuSO_4.5H_2O$ and 67 ml of toluene were charged into a flask having a capacity of 300 ml, which was replaced with sufficient nitrogen gas, and agitated to obtain a suspension liquid.

Then, 24 ml of trimethyl aluminum diluted with 150 ml of toluene was charged dropwise into the suspension liquid while maintaining the temperature thereof at from $-30°$ to $-20°$ C.

The liquid was agitated while maintaining a temperature of 0° C. for 6 hours, was then gradually warmed, and then reacted at temperature of 40° C. for 12 hours.

Thereafter, a solid was separated from solution by filtration to obtain an aluminoxane solution.

The aluminoxane solution was used in polymerization reaction described hereinafter.

POLYMERIZATION EXAMPLE-1

Polymerization of 5-vinyl-2-norbornene 35 ml of toluene and 2 milli mole of the methyl aluminoxane obtained in the above described preparing method and 0.1 milli mole of zirconium chloride were charged into a pressure resistible glass flask having a capacity of 100 ml replaced with nitrogen gas.

In succession, 5 ml of 5-vinyl-2-norbornene was added, followed by being heated to 80° C. and being polymerized for 24 hours. After the completion of the polymerization, the reaction mixture was put into methanol-hydrochloric acid to stop the reaction, followed by filtration of a produced polymer and drying thereof, whereby 0.91 g of the polymer was obtained.

It was confirmed that the polymer was represented by the formula (I) based on absorption peaks of vinyl groups at 3070, 1630, 980, and 900 $cm^{-1}$ of IR the spectrum.

In addition, it was confirmed that absorption peaks at 710 to 720 $cm^{-1}$ caused by inner double bonds were not substantially observed.

Furthermore, it was confirmed that absorption peaks at 4.8 to 5.2 ppm from protons of vinyl groups were observed, but a sharp absorption peak at 6.0 ppm from protons of an inner double bond was not substantially observed by an analysis with $^1$H—NMR spectrum.

From the above analysis, it was clarified that the reaction proceeded simply by an addition polymerization of the inner double bond of 5-vinyl-2-norbornene.

The molecular weight Mn (Mn indicates number average molecular weight) and the molecular weight distribution Mw/Mn (Mn indicates weight average molecular weight) were 1170 (value determined based on polystyrene standard) and 2.40, respectively, by gel permeation chromatography analysis.

POLYMERIZATION EXAMPLE 2

Polymerization of 5-vinyl-2-norbornene 50 ml of toluene and 30 milli mole of the methylaluminoxane obtained in the above described preparing method and 1 milli mole of bis(cyclopentadienyl)zirconium dichloride were charged into a pressure resistible glass flask having a capacity of 100 ml replaced with nitrogen gas.

In succession, 100 ml of 5-vinyl-2-norbornene was added, followed by being heated to 80° C. and being polymerized for 12 hours.

After the completion of the polymerization, the reaction mixture was put into methanol-hydrochloric acid to stop the reaction, followed by a filtration of a produced polymer and drying thereof, whereby 38.0 g of a polymer was obtained.

It was confirmed that the polymer was represented by the formula (I) based on absorption peaks of vinyl groups at 3070, 1630, 980 and 900 cm$^{-1}$ of infra-red chromatograph spectrum.

In addition, it was confirmed that absorption peaks at 710 to 720 cm$^{-1}$ from the inner double bond were not substantially observed.

Furthermore, it was confirmed that absorption peaks at 4.8 to 5.2 ppm from protons of vinyl groups were observed, but a sharp absorption peak at 6.0 ppm from protons of inner double bond was not substantially observed by an analysis with $^1$H—NMR spectrum.

The molecular weight Mn and the molecular weight distribution Mw/Mn were 1050 and 2.59, respectively, by gel permeation chromatography analysis.

POLYMERIZATION EXAMPLE-3

Polymerization of 5-vinyl-2-norbornene

First, 50 ml of toluene and 20 milli mole of the methylaluminoxane obtained in the above described preparing method and 0.5 milli mole of bis(cyclopentadienyl)zirconium dichloride were charged into a pressure resistible glass flask having a capacity of 100 ml replaced with nitrogen gas.

In succession, 100 ml of 5-vinyl-2-norbornene was added, followed by being heated to 80° C. and being polymerized for 12 hours. After completion the polymerization, a reaction mixture was put into methanol-hydrochloric acid to stop the reaction, followed by filtration of a produced polymer and drying thereof, whereby 49.4 g of the polymer was obtained.

It was confirmed that the polymerization proceeded by only an addition of the inner double bonds by an analysis with infra-red absorption spectrum and an $^1$H—NMR spectrum analysis.

The molecular weight Mn and the molecular weight distribution Mw/Mn were 1020 (a value converted into polystyrene) and 1.80, respectively, by gel permeation chromatography analysis.

EPOXIDATION EXAMPLE-1

Epoxidation of the Obtained Poly(5-Vinyl-2-Norbornene)

First, 0.1 g of the poly(5-vinyl-2-norbornene) was charged into a flask having a capacity of 10 ml, then 3.0 g of chloroform was added and agitated to dissolve while being maintained at 20° C. for 30 minutes.

Then 0.26 g of ethyl acetate solution containing 30 % of peracetic acid was added at once to the chloroform solution, followed by being reacted at temperature of 40° C. for 3 hours.

After the reaction, 3.0 g of pure water was put into the crude reacted solution, followed by agitating at a temperature of 30° C. for 10 minutes and maintaining a temperature of 30° C. for 20 minutes to form an interface between two phases.

The two phases were composed of an upper water solution and a lower chloroform solution.

The upper water solution was removed by an injection, and the lower chloroform solution was washed with water two times.

The solution obtained after washing with water was evaporated to remove the low boiling fraction, with a rotary evaporator at a temperature of 100° C. and vacuum of 10 mmHg for two hours, whereby 0.11 g of a white colored solid was obtained in the flask.

It was confirmed that 70 % of the solid was epoxidized by infra-red absorption spectrum analysis in which 70% of the absorption peak at 1633 cm$^{-1}$ by vinyl group was lower and an absorption peak at 1232 cm$^{-1}$ by epoxy group was observed. In addition, it was confirmed that 70% of the vinyl group at δ(ppm) 5.8 to 6.0 was decreased, by H—NMR spectrum analysis.

EPOXIDATION EXAMPLE-2

Epoxidation of the Obtained Poly(5-Vinyl-2-Norbornene)

First, 0.1272 g of the poly(5-vinyl-2-norbornene) was charged into a flask having a capacity of 10 ml, and 3.0 g of chloroform was then added and agitated to dissolve while maintained at 20° C. for 30 minutes.

Then 0.33 g of ethyl acetate solution containing 30% of peracetic acid was added at once to the chloroform solution, followed by being reacted at temperature of 50° C. for 8 hours.

After the reaction, 3.0 g of pure water was put into the crude reacted solution, followed by agitating at a temperature of 30° C. for 10 minutes and maintaining same at the temperature of 30° C. for 20 minutes to form an interface between two phases.

The two phases were composed of an upper water solution and a lower chloroform solution.

The upper water solution was removed by an injection, and the lower chloroform solution was additionally washed with water two times.

The solution obtained after washing with water was evaporated to remove the low boiling fraction with a rotary evaporator at temperature of 100° C. and vacuum of 10 mmHg for 2 hours, whereby 0.1200 g of a white colored solid was obtained in the flask.

It was confirmed that 80% of the solid was epoxidized by infra-red absorption spectrum analysis in which 80% of the absorption peak at 1633 cm$^{-1}$ group was lowered, and an absorption peak at 1232 cm$^{-1}$ by epoxy group was observed.

In addition, it was confirmed that 80% of the vinyl group at δ(ppm) 5.8 to 6.0 was decreased by $^1$H—NMR spectrum analysis.

EPOXIDATION EXAMPLE-3

Epoxidation of the obtained poly(5-vinyl-2-norbornene)

First, 0.1120 g of the poly(5-vinyl-2-norbornene) was charged into a flask having a capacity of 10 ml, and 3.0 g of chloroform was then added and agitated to dissolve while maintained at 20° C. for 30 minutes.

Then 0.48 g of ethyl acetate solution containing 30% of peracetic acid was added at once to the chloroform solution, followed by being reacted at temperature of 50° C. for 16 hours.

After the reaction, 3.0 g of pure water was put into the crude reacted solution, followed by agitating at a temperature of 30° C. for 10 minutes and maintaining same at the temperature of 30° C. for 20 minutes to form an interface between two phases.

The two phases were composed of an upper water solution and a lower chloroform solution.

The upper water solution was removed by an injection, and the lower chloroform solution was additionally washed with water two times.

The solution obtained after washing with water was evaporated to remove the low boiling fraction with a rotary evaporator at temperature of 100° C. and vacuum of 10 mmHg for 2 hours, whereby 0.110 g of a white colored solid was obtained in the flask.

It was confirmed that 90% of the solid was epoxidized by infra-red absorption spectrum analysis in which 100% of the absorption peak at 1633 cm$^{-1}$ by vinyl group was lowered, and an absorption peak at 1232 cm$^{-1}$ by epoxy group was observed.

In addition, it was confirmed that 100% of the vinyl group at δ(ppm) 5.8 to 6.0 disappeared by $^1$H—NMR spectrum analysis.

POLYMERIZATION EXAMPLE-4

Polymerization of 5-ethylidene-2-norbornene

The same procedures as described in Polymerization Example-1 were repeated, except that 5 ml of 5-vinyl-2-norbornene was replaced with 5 ml of 5-ethylidene-2-norbornene, and 1.41 g of poly(5-ethylidene-2-norbornene) was obtained.

From $^1$H—NMR spectrum analysis, it was confirmed that the reaction proceeded only by an addition polymerization of the inner double bond of 5-vinyl-2-norbornene.

The molecular weight Mn and the molecular weight distribution Mw/Mn were 1066 and 1.26, respectively, by gel permeation chromatography analysis.

EPOXIDATION EXAMPLE-4

Epoxidation of the obtained poly(5-ethylidene-2-norbornene)

The same procedures as described in Epoxidation Example-1 were repeated, except that 0.1 g of poly(5-vinyl-2-norbornene) was replaced with 0.10 g of poly(5-ethylidene-2-norbornene) and 0.26 g of ethyl acetate solution containing 30% of peracetic acid was replaced with 0.45g, whereby 0.11 g of white colored solid was obtained in the flask.

It was confirmed that 100% of the solid was epoxidized by infra-red absorption spectrum analysis in which 100% of an absorption peak at 1620 cm$^{-1}$ cm by vinyl group was decreased, and an absorption peak at 1230 cm$^{-1}$ by epoxy group was observed.

In addition, it was confirmed that 100% of vinyl group at δ(ppm) 5.8 to 6.0 disappeared by $^1$H—NMR spectrum analysis.

POLYMERIZATION EXAMPLE-5

Polymerization of dicyclopentadiene

The same procedures as described in Polymerization Example-1 were repeated, except that 5 ml of -vinyl-2-norbornene was replaced with 5 ml of cyclopentadienee, and 1.50 g of poly(cyclopentadiene) was obtained.

From $^1$H—NMR spectrum analysis, it was confirmed that the reaction proceeded only by an addition polymerization of the inner double bond of dicyclopentadiene.

The molecular weight Mn and the molecular weight distribution Mw/Mn were 572 and 1.19, respectively, by gel permeation chromatography analysis.

EPOXIDATION EXAMPLE 5

Epoxidation of the poly(cyclopentadiene) obtained in Polymerization Example-5

The same procedures as described in Epoxidation Example-1 were repeated, except that 0.10 g of poly(5-vinyl-2-norbornene) was replaced with 0.10 g of poly(cyclopentadiene) and 3 g of pure water was put into the crude reacted solution after reaction, whereby 0.12 g of white colored solid was obtained.

It was confirmed that 100% of the solid was epoxidized by infra-red absorption spectrum analysis in which an absorption peak at 1625 cm$^{-1}$ by vinyl group was decreased to 0% and an absorption peak at 1235 cm$^{-1}$ by epoxy group was observed.

In addition, it was confirmed that 100% of vinyl group at δ(ppm) 5.8 to 6.0 disappeared, by $^1$H—NMR spectrum analysis.

EPOXIDATION EXAMPLE-6

Epoxidation of poly(5-vinyl-2-norbornene)

First, 55.67 g of the poly(5-vinyl-2-norbornene) and 504.29 g of chloroform were charged into a flask, 235.07 g of ethyl acetate solution containing 30% of peracetic acid was added to the chloroform solution for 2 hours, followed by being reacted while maintained at a temperature of 50° C, and being additionally aged for 1 hour after the reaction.

Then, 200 g of chloroform and 200 g of water were put into the crude reacted solution, followed by agitating for 20 minutes and then maintaining at the temperature of 50° C. for 20 minutes to form an interface between two phases.

The two phases were composed of an upper water solution and a lower chloroform solution.

The water solution was removed and 200 g of water was added into the chloroform solution for washing followed by removing the water solution.

The washing with 200 g of water was repeated two times.

The solution obtained after washing with water was evaporated to remove the low boiling fraction with a rotary evaporator at a temperature of 100° C. and vacuum of 100 to 120 mmHg for 1 hour, followed by being additionally evaporated with a vacuum pump at the same temperature for two hours, whereby 52.45 g of a white colored solid was obtained.

It was confirmed that 70% of the solid was epoxidized by infra-red absorption spectrum analysis in which an absorption peak at 1625 cm$^{-1}$ by vinyl group disappeared and an absorption peak at 1235 cm$^{-1}$ by epoxy group was observed.

In addition, it was confirmed that vinyl group at 67 (ppm) 5.8 to 6.0 disappeared, by $^1$H—NMR spectrum analysis.

While the invention has been described in detail and with reference to specific embodiments thereof, it will be apparent to one skilled in the art that various changes and modifications can be made therein without departing from the spirit and scope thereof.

What is claimed is:

1. A composition consisting essentially of a homopolymer or copolymer consisting of one or more members selected from a group consisting of formulae (I), (II), and (III):

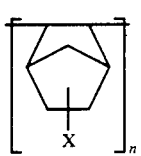
(I)

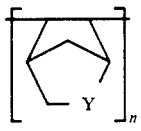
(II)

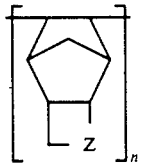
(III)

wherein
n is an integer of 2 to 1000,
X represents a mixture of

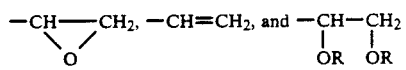

groups, in which R is either H, an alkyl group, an alkyl carbonyl group, or an aryl carbonyl group, provided that at least one

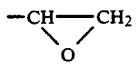

group is contained therein,
Y represents a mixture of

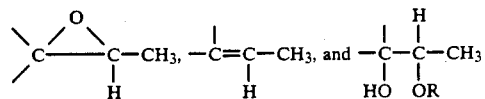

groups in which R is either H, an alkyl group, an alkyl carbonyl group or an aryl carbonyl group, provided that at least one

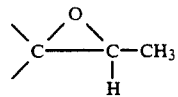

group is contained therein, and
Z represents a mixture of

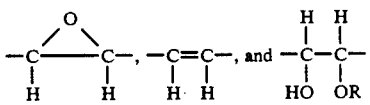

groups in which R is either H, an alkyl group a carboalkyl group, or a carboaryl group, provided that at least one

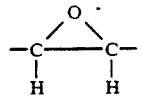

group is contained therein.

2. A composition comprising an epoxy compound represented by formula (I)

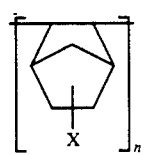
(I)

wherein n is an integer of 2 to 1000, X represents a mixture of

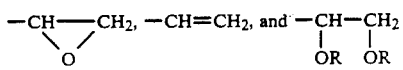

in which R is either H, an alkyl group, an alkyl carbonyl group, or an aryl carbonyl group, provided that at least one

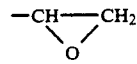

group is contained therein.

3. A composition comprising an epoxy compound represented by formula (II)

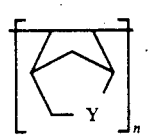
(II)

wherein n is an integer of 2 to 1000, Y represents a mixture of

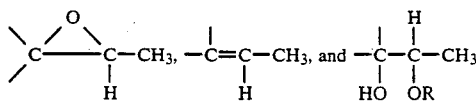, groups, in which R is either H, an alkyl group, an alkyl carbonyl group, an aryl carbonyl group, provided that at least one

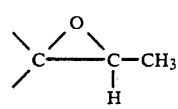

group is contained therein.

4. A composition comprising an epoxy compound represented by formula (III)

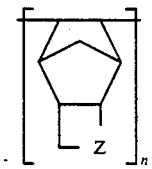 (III)

wherein n is an integer of 2 to 1000, Z represents a mixture of

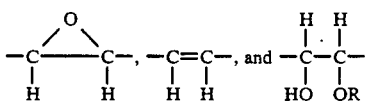

in which R is either H, an alkyl group, a alkyl carbonyl group or an aryl carbonyl group, provided that at least one

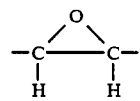

group is contained therein.

* * * * *